US008485881B2

(12) United States Patent
Griswold et al.

(10) Patent No.: US 8,485,881 B2
(45) Date of Patent: Jul. 16, 2013

(54) GAMING MACHINE WITH MOVABLE DISPLAY

(75) Inventors: Chauncey Griswold, Reno, NV (US); Jean-Pierre Legras, Reno, NV (US); Harold "Sonny" Mattice, Gardnerville, NV (US); Richard L. Wilder, Sparks, NV (US); James W. Stockdale, Clio, CA (US)

(73) Assignee: IGT, Reno, NV (US)

( * ) Notice: Subject to any disclaimer, the term of this patent is extended or adjusted under 35 U.S.C. 154(b) by 2205 days.

(21) Appl. No.: 11/417,373

(22) Filed: May 3, 2006

(65) Prior Publication Data

US 2007/0111776 A1 May 17, 2007

Related U.S. Application Data

(60) Provisional application No. 60/714,550, filed on Nov. 17, 2005.

(51) Int. Cl.
*A63F 13/08* (2006.01)

(52) U.S. Cl.
USPC .................................. 463/16; 463/34; 463/46

(58) Field of Classification Search
USPC .................................... 463/16, 30–34, 38, 46
See application file for complete search history.

(56) References Cited

U.S. PATENT DOCUMENTS

| | | | | |
|---|---|---|---|---|
| 6,149,522 | A | 11/2000 | Alcorn et al. | |
| 6,264,561 | B1 | 7/2001 | Saffari | |
| 6,394,907 | B1 | 5/2002 | Rowe | |
| 6,643,124 | B1 * | 11/2003 | Wilk | 361/679.04 |
| 6,645,077 | B2 | 11/2003 | Rowe et al. | |
| 6,685,567 | B2 | 2/2004 | Cockerille et al. | |
| 6,804,763 | B1 | 10/2004 | Stockdale et al. | |
| 6,859,219 | B1 * | 2/2005 | Sall | 345/1.1 |
| 6,863,608 | B1 | 3/2005 | LeMay et al. | |
| 6,866,586 | B2 | 3/2005 | Oberberger et al. | |
| 6,887,157 | B2 | 5/2005 | LeMay et al. | |
| 2002/0155891 | A1 * | 10/2002 | Okada et al. | 463/42 |
| 2003/0073497 | A1 | 4/2003 | Nelson | |
| 2003/0148804 | A1 * | 8/2003 | Ikeya et al. | 463/16 |
| 2003/0203756 | A1 | 10/2003 | Jackson | |
| 2004/0002379 | A1 | 1/2004 | Parrott et al. | |
| 2004/0147314 | A1 | 7/2004 | Le May et al. | |
| 2004/0152509 | A1 * | 8/2004 | Hornik et al. | 463/20 |
| 2004/0192430 | A1 * | 9/2004 | Burak et al. | 463/20 |
| 2005/0020348 | A1 * | 1/2005 | Thomas et al. | 463/20 |
| 2005/0090306 | A1 | 4/2005 | Seelig et al. | |

(Continued)

OTHER PUBLICATIONS

Pictures of video display devices shown at L.G. Booth, Consumer Electronics Show, Las Vegas, NV, Jan. 2005 (3 colored pages).

*Primary Examiner* — Arthur O. Hall
*Assistant Examiner* — Allen Chan
(74) *Attorney, Agent, or Firm* — Foley & Lardner LLP

(57) ABSTRACT

A technique is described for operating a gaming machine adapted to receive a wager on a game of chance. In at least one embodiment, the gaming machine may be adapted to dynamically change its volume. In one implementation, the gaming machine may include a first movable display which may be used to dynamically and/or automatically change the volume of the gaming machine. For example, the first movable display may be automatically moved to a first position to thereby establish a first volume of the gaming machine. The first movable display may also be automatically moved to a second position to thereby establish a second volume of the gaming machine.

36 Claims, 8 Drawing Sheets

U.S. PATENT DOCUMENTS

2005/0192099 A1 9/2005 Nguyen et al.
2005/0277468 A1* 12/2005 Fitzsimons et al. ............. 463/31
2006/0003824 A1* 1/2006 Kobayashi et al. ............... 463/1
2006/0046822 A1 3/2006 Kaminkow

* cited by examiner

300

GAMING MACHINE WITH MOVABLE DISPLAY

CROSS-REFERENCE TO RELATED APPLICATION

This application claims benefit of United Stated Provisional Patent Application No. 60/714,550, entitled "GAMING MACHINE WITH MOVABLE DISPLAY," which was filed on Nov. 17, 2005 and which is hereby incorporated by reference in its entirety for all purposes.

BACKGROUND OF THE INVENTION

1. Field of the Disclosure

The present invention relates generally to gaming machines, and, more particularly, to a gaming machine with at least one movable display.

2. Background

Gaming machines providing games such as electronically driven video slots, video poker, video blackjack, video keno, video bingo, video pachinko, video lottery, and mechanically driven reel slots, etc., are well known in the gaming industry. Generally video gaming machines are configured with a main video display for displaying video game images including video images representing game play outcome (e.g., simulated reel symbols in the case of a slot game, simulated cards, simulated numbers, etc.). Mechanical spinning reel slot machines, on the other hand, generally include a main reel display area configured to allow a player to view a reel symbol array provided by the stopped mechanical spinning reels.

Generally, the popularity of gaming machines is dependent on the likelihood (or perceived likelihood) of winning money at the machine and the intrinsic entertainment value of the machine. The payback percentage that each gaming machine is programmed to provide is tightly controlled by regulatory authorities. Consequently, often the only distinguishing feature between gaming machines is the entertainment value they provide. Gaming establishments strive to place the most entertaining gaming machines on their casino floors to attract players and increase profitability. In the competitive gaming machine industry there is a continuing need for gaming machine manufacturers to produce new and more entertaining types of games.

One concept that has been successfully employed to enhance the entertainment value of the gaming machine is the "bonus" game. The bonus game is generally mounted in a top box on top of the base game cabinet and is played in conjunction with the "base" game. The bonus game may comprise any type of game, either similar or completely different from the base game, and is triggered upon the occurrence of a selected event or outcome in the base game.

Typically, the bonus game is triggered by certain predetermined base game outcomes. The bonus game typically acts as a reward for achieving certain winning outcomes in the base game. In this capacity, the bonus game typically does not require a further wager; players are usually only allowed to win credits. The player is allowed to play the bonus game, collecting as many credits as possible, before being exited from the bonus back to the base game.

The bonus game concept has been extremely successful because players are attracted to the enhanced entertainment value it provides. Providing an attractive and interesting game display for the gaming machine is one of the most effective methods for increasing player entertainment value. Consequently, any improved game display can provide a substantial increase in player entertainment value and an attendant increase in gaming machine revenues for the gaming establishment. Because such games are attractive to both players and operators, there is a continuing need to develop new and more entertaining features.

SUMMARY OF THE INVENTION

Various aspects of the present invention are directed to different methods, systems, and computer program products for operating a gaming machine adapted to receive a wager on a game of chance. In at least one embodiment, the gaming machine may be adapted to dynamically change its volume. In one implementation, the gaming machine may include a first movable display which may be used to dynamically and/or automatically change the volume and/or viewable surface area of the gaming machine. For example, the first movable display may be automatically moved to a first position to thereby establish a first volume of the gaming machine. The first movable display may also be automatically moved to a second position to thereby establish a second volume of the gaming machine.

In at least one implementation, the gaming machine may also include a second movable display. A virtualized display for displaying virtualized content may be implemented using the first movable display and the second movable display. In one implementation, a first portion of the virtualized content may be displayed on the first movable display, and a second portion of the virtualized content may be displayed on the second movable display.

Another aspect of the present invention is directed to different methods, systems, and computer program products for operating a gaming system including a plurality of gaming machines each adapted to receive a wager on a game of chance. The plurality of gaming machines may include a first gaming machine having a first movable display and a second gaming machine having a second movable display. Movement of the first and second movable displays may be coordinated in order to facilitate multi-player features. Additionally, content displayed on the first and second movable displays may also be coordinated in order to facilitate multi-player features. According to various embodiments, examples of some multi-player features include multi-player game play features, multi-player bonus features, tournament gaming play features, etc. In at least one embodiment, a virtualized display for displaying virtualized content may be implemented using the first movable display and the second movable display. In one implementation, a first portion of the virtualized content may be displayed on the first movable display, and a second portion of the virtualized content may be displayed on the second movable display.

Another aspect of the present invention is directed to different methods, systems, and computer program products for implementing a bonus device adapted for use with a gaming machine configured or designed to receive a wager on a game of chance. In one implementation, the bonus device may include at least one interface, a movable display, and a motion control device for controlling movement of the movable display. According to at least one implementation, the bonus device may be configured or designed to dynamically move the movable display in response to at least one signal received from a controller of the gaming machine.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not obscure the present invention.

Figure 1:
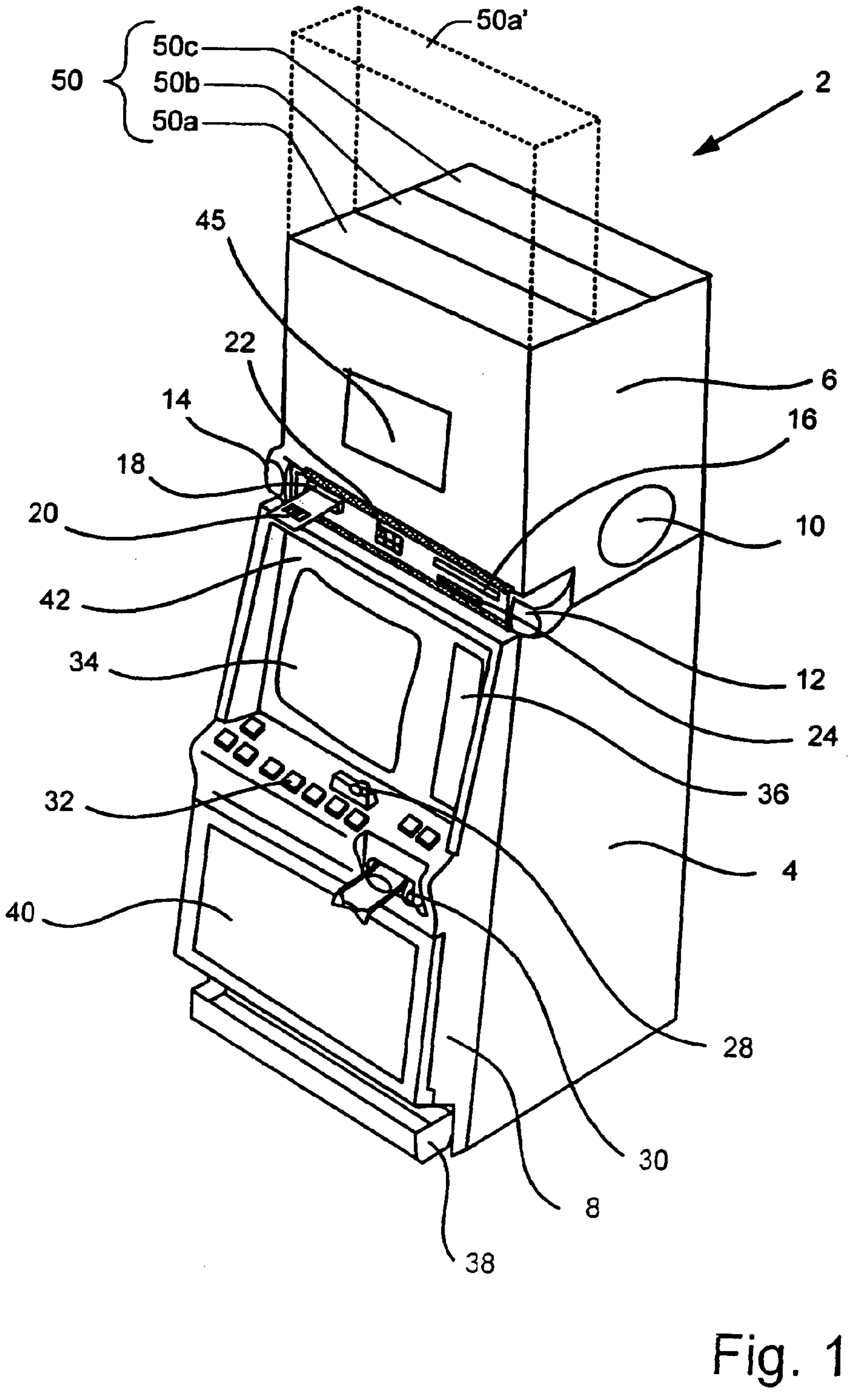
FIG. 1 shows a prospective view of an exemplary gaming machine 2 in accordance with a specific embodiment of the present invention.

FIG. 1 shows a prospective view of an exemplary gaming machine 2 in accordance with a specific embodiment of the present invention. As illustrated in the example of FIG. 1, machine 2 includes a main cabinet 4, which generally surrounds the machine interior (illustrated, for example, in FIG. 3) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. According to a specific embodiment, the devices may be controlled by code executed by a master gaming controller housed inside the main cabinet 4 of the machine 2. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 1, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 1. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller) housed within the main cabinet 4 of the machine 2.

As illustrated in FIG. 1, a main display 34 is typically used in gaming machines to display the game and its outcome to players. In the past, gaming machines utilized fixed position game displays. Aside from the content shown on the display, the physical display itself was not part of the entertainment value of the game. However, as discussed in greater detail below, one aspect of the present invention is directed to a technique for utilizing a gaming machine display as part of the entertainment value of the gaming machine.

According to specific embodiments, to enhance the entertainment value of the gaming machine, the gaming machine may include one or more movable displays (e.g., 50) which are configured or designed to interact with other game features of the gamming machine. In at least one embodiment, a movable display may be implemented utilizing a variety of different display technologies such as, for example: flat panel displays (FPDs), LED displays, plasma displays, field emission displays, digital micromirror devices (DMD), LCD displays, Organic Light-Emitting Diode (OLED) displays, Light-Emitting Polymer (LEP) displays, CRT displays, etc. The display may be framed and may exist in any shape consistent with the technology utilized the type of display being used. For example, an LCD may be cut into shapes such as circles, triangles, or any free-form shape desired.

The movable display can be utilized in a variety of ways such as, for example, as part of the game play, as a bonus topper, as a game marker, as a pointer, or simply as a visual entertainment device that may or may not provide information pertinent to the game outcome. The movable display may interact with mechanical, or other features of the game.

According to specific embodiments, the movable display may be used to display any variety of content including, for example, static or dynamic pictures, text, and/or video images. Such images may include, for example, animations, motion pictures, photographs, or other video representations. Other content may include, for example: content relating to available services, game play content, bonus game content, player tracking information, attracts, advertising, entertainment programming, sporting events, internet programming, and/or any other type of content which is able to be displayed. The movable display may continuously or intermittently display such content, as desired.

In one embodiment, the displayed images may correlate to the location of the movable display and/or to the current game play (including game outcomes). The combination of the movable display and its displayed visual images elicits greater visual interest and excitement from the player during game play. Additionally, because of the movable display(s) may be physically extended and/or retracted as desired, the technique of the present invention also provides the ability to automatically and dynamically change the size, dimensions, surface area, and/or volume of the gaming machine 2. For example, as illustrated in FIG. 1, movable display 50*a* may be automatically moved during game play from an initial retracted position to an extended position (50*a*') to thereby dynamically change the dimensions, viewable surface area and physical volume of the gaming machine 2, which, in turn, may elicit greater interest and excitement from the player and/or spectators during game play. Of course, the movable displays may also be extended and/or retracted at other times (e.g., not during game play), in order, for example, to attract attention or to elicit greater interest and excitement from persons in the casino.

Because the movable displays of the gaming machine may be used to dynamically change the dimensions, surface area, and/or physical volume of the gaming machine, the gaming machine of the present invention provides a unique ability to elicit interest and excitement from persons in the casino in a manner which cannot be achieved by conventional gaming machines. For example, in at least one embodiment, a gaming machine of the present invention may be configured or designed to include multiple movable displays which may be extended in a manner which results in the overall height of the gaming machine (including the movable displays) increasing, for example, by more than 50, percent. Such a height increase may provide a dramatic visual effect in which the gaming machine appears to tower over other gaming machines in the vicinity. Moreover, such a display tower may be easily seen and/or recognized across great distances on the casino floor. According to a specific embodiment, the volume of the gaming machine 2 may correspond to the physical space which is defined by the exterior or viewable surfaces of the gaming machine (and its components).

Many other potential applications for the movable display exist that can provide enhanced gaming functions. For example, besides displaying visual images which have entertainment value, the movable display may be used to display a variety of other information such as, for example, advertising information, game information, play or information, network gaming information, etc.

Besides providing enhanced entertainment value, the movable display may also provide potential economic advantages. In some cases, for example, one or more smaller movable displays may be substituted for a larger, static display. This capability may have significant cost advantages since the cost of most displays increase dramatically with their size. Alternatively, a single movable display may be substituted for multiple static display units, which may also provide significant cost savings.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. In at least one embodiment, a movable game display device (which may include, for example, one or more movable displays) may be directly or indirectly coupled to the host computer and/or remote gaming device, and may be adapted to display information and/or images relating to the game(s) being played on the remote gaming device. Thus, those of skill in the art will understand that the present invention, as described below, can be deployed on most any gaming machine environment now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in U.S. publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

In at least one embodiment, at least a portion of the trusted memory devices/sources may correspond to memory which cannot easily be altered such as, for example, EPROMS, PROMS, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in U.S. publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34 and/or movable display(s) 50. Other game and prize information may also be displayed in the video display screen 45 (located in the top box) and/or movable display(s) 50.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using at least one of the display screens 34, 45, or 50, and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2, from lights behind the belly glass 40, from images or other information displayed on one or more movable displays 50, or any combination thereof. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 2:
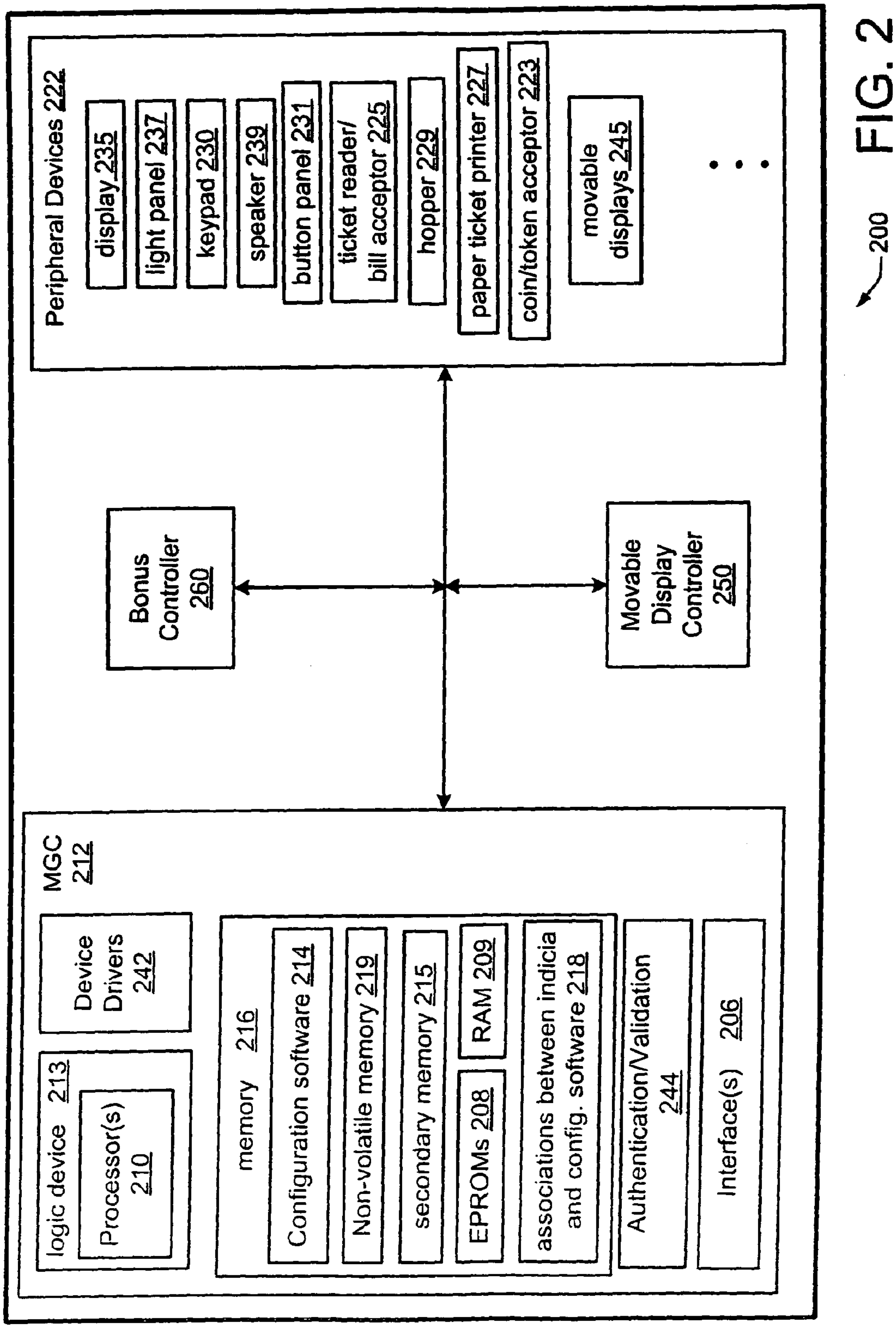
FIG. 2 is a simplified block diagram of an exemplary gaming machine 200 in accordance with a specific embodiment of the present invention.

FIG. 2 is a simplified block diagram of an exemplary gaming machine 200 in accordance with a specific embodiment of the present invention. As illustrated in the embodiment of FIG. 2, gaming machine 200 includes at least one processor 210, interfaces 222, and memory 216.

In one implementation, processor 210 and master gaming controller 212 are included in a logic device 213 enclosed in a logic device housing. The processor 210 may include any conventional processor or logic device configured to execute software allowing various configuration and reconfiguration tasks such as, for example: a) communicating with a remote source via communication interface 206, such as a server that stores authentication information or games; b) converting signals read by an interface to a format corresponding to that used by software or memory in the gaming machine; c) accessing memory to configure or reconfigure game parameters in the memory according to indicia read from the device; d) communicating with interfaces, various peripheral devices 222 and/or I/O devices 211; e) operating peripheral devices 222 such as, for example, card reader 225 and paper ticket reader 227; f) operating various I/O devices such as, for example, display 235, key pad 230 and a light panel 216; etc. For instance, the processor 210 may send messages including configuration and reconfiguration information to the display 235 to inform casino personnel of configuration progress. As another example, the logic device 213 may send commands to the light panel 237 to display a particular light pattern and to the speaker 239 to project a sound to visually and aurally convey configuration information or progress. Light panel 237 and speaker 239 may also be used to communicate with authorized personnel for authentication and security purposes.

In specific embodiments where the gaming machine includes a “bonus” game, gaming machine 200 may also include a bonus controller 260 for controlling aspects relating to the bonus game.

As illustrated in the embodiment of FIG. 2, the gaming machine 200 also includes a movable display controller 250 which may be configured or designed to control various aspects relating to movable displays 245 such as, for example: images, text, and/or other content displayed on one or more of the movable displays; motion control of the movable displays; etc. In at least one implementation, the movable display controller 250 may perform specific operations in response to instructions or signals received from a master gaming controller 212 and/or bonus controller 260. In alternate embodiments, the content and/or movement of the movable displays 245 may be directly controlled by the master gaming controller 212, bonus controller 260, a remote server, an external device, or any combination thereof.

Peripheral devices 222 may include several device interfaces such as, for example: card reader 225, bill validator/paper ticket reader 227, hopper 229, etc. Card reader 225 and bill validator/paper ticket reader 227 may each comprise resources for handling and processing configuration indicia such as a microcontroller that converts voltage levels for one or more scanning devices to signals provided to processor 210. In one embodiment, application software for interfacing with peripheral devices 222 may store instructions (such as, for example, how to read indicia from a portable device) in a memory device such as, for example, non-volatile memory, hard drive or a flash memory.

The gaming machine 200 also includes memory 216 which may include, for example, volatile memory (e.g., RAM 209), non-volatile memory 219 (e.g., disk memory, FLASH memory, EPROMs, etc.), unalterable memory (e.g., EPROMs 208), etc. The memory may be configured or designed to store, for example: 1) configuration software 214 such as all the parameters and settings for a game playable on the gaming machine; 2) associations 218 between configuration indicia read from a device with one or more parameters and settings; 3) communication protocols allowing the processor 210 to communicate with peripheral devices 222 and I/O devices 211; 4) a secondary memory storage device 215 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11×(IEEE 802.11 standards), hiperlan/2, HomeRF, etc.) for allowing the gaming machine to communicate with local and non-local devices using such protocols; etc. Typically, the master gaming controller 212 communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers may be stored in memory 216. For example, device drivers for different types of card readers, bill validators, displays, and key pads may all be stored in the memory 216. When one type of a particular peripheral device is exchanged for another type of the particular device, a new device driver may be loaded from the memory 216 by the processor 210 to allow communication with the device. For instance, one type of card reader in gaming machine 200 may be replaced with a second type of card reader where device drivers for both card readers are stored in the memory 216.

In some embodiments, the software units stored in the memory 216 may be upgraded as needed. For instance, when the memory 216 is a hard drive, new games, game options, various new parameters, new settings for existing parameters, new settings for new parameters, device drivers, and new communication protocols may be uploaded to the memory from the master gaming controller 104 or from some other external device. As another example, when the memory 216 includes a CD/DVD drive including a CD/DVD designed or configured to store game options, parameters, and settings, the software stored in the memory may be upgraded by replacing a first CD/DVD with a second CD/DVD. In yet another example, when the memory 216 uses one or more flash memory 219 or EPROM 208 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

It will be apparent to those skilled in the art that other memory types, including various computer readable media, may be used for storing and executing program instructions pertaining to the operation of the present invention. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

Figure 3:
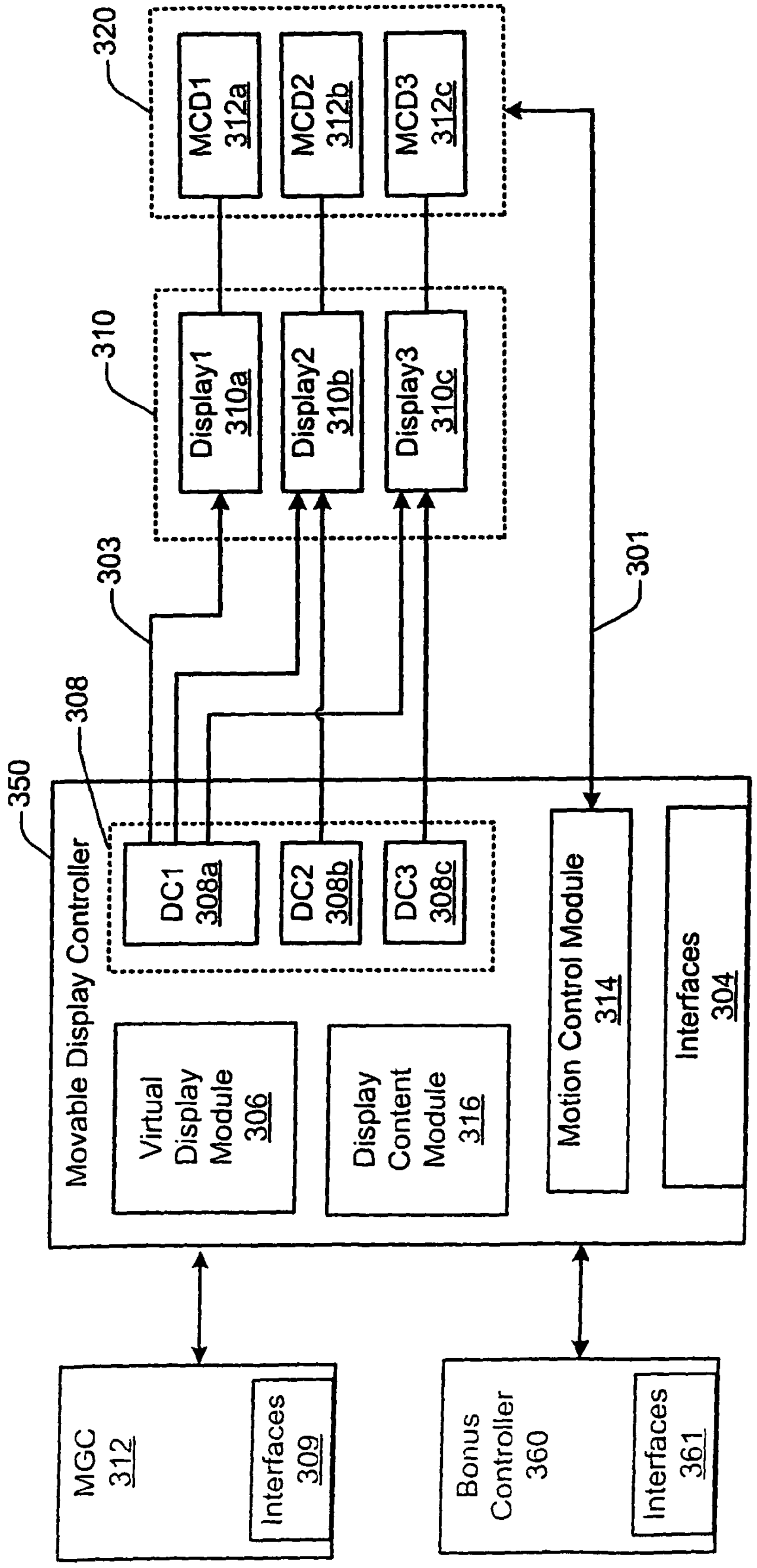
FIG. 3 shows a block diagram of a specific embodiment of various gaming machine components which may be used for implementing aspects of the movable display technique of the present invention.

FIG. 3 shows a block diagram of a specific embodiment of various gaming machine components which may be used for implementing aspects of the movable display technique of the present invention. In at least one implementation, the movable display controller 350 and its associated components may perform specific operations in response to instructions or signals received from master gaming controller 312 and/or bonus controller 360.

According to a specific embodiment, movable display controller 350 may be adapted to provide content to one or more movable displays 310. For example, as illustrated in FIG. 3, movable display controller 350 may include a plurality of separate display controllers 308 for providing and controlling content which is to be displayed on one or more of the movable displays 310. In one implementation, each display controller (e.g., DC3) may be associated with a respective movable display (Display3). Additionally, at least one display controller (e.g., DC1) may be associated with multiple movable displays. According to a specific implementation, the display controller(s) may be implemented using at least one display adapter and/or video card that is compatible with the type of display(s) to be controlled. For example, in one implementation, multiple display controllers 308 may be used for displaying content on a plurality of movable displays 310. Alternatively, one display controller (e.g., 308*a*) may be adapted to independently display desired content on a plurality of different movable displays 310. According to one embodiment, different types of display content may be provided to each of the movable displays 310, thereby allowing each display to function independently from the other displays. For example, Display1 310*a* may be used to display videos or images, while Display2 310*b* is used to display text. Alternatively, as described in greater detail below multiple movable displays may be used to form a virtual display for displaying content which may span across multiple displays.

Display information and/or signals may be provided from a display controller to a movable display using a one or more standardized display protocols such as, for example: VGA, DCI, PCI, AGP, PCI Express, PCI-X, etc. Of course, other display protocols such as, for example, non-standardized display protocols, proprietary display protocols, etc. may also be used, if desired. In at least one implementation, the movable display controller 350 may include a display content module 316 configured or designed to provide display content information to each or selected display controllers. The display content module 316 may include memory for storing at least a portion of the display content information. In at least one embodiment, all or portions of the display content may be stored at one or more network locations and/or RF links. The display content module may also be adapted to receive display content information from different sources such as, for example, from bonus controller 360 and/or from remote sources. Such display content information may be received via one or more interfaces such as, for example, master gaming controller interfaces 309, bonus controller interfaces 361, and/or movable display controller interfaces 304. In at least one implementation, one or more of these interfaces may be configured or designed to provide a communication path for exchanging information with external devices such as, for examples other gaming machines, other bonus controllers, gaming servers, content providers, external displays, peripheral devices, etc.

As illustrated in the embodiment of FIG. 3, movable display controller 350 may also include a virtual display module 306 configured or designed to control portions of the display content in order to enhance or modify the content to be displayed on the movable displays 310. For example, the virtual display module 306 may include functionality for implementing a virtual display using a plurality of separate displays. An example of this is illustrated in FIG. 12 of the drawings.

Figure 12:
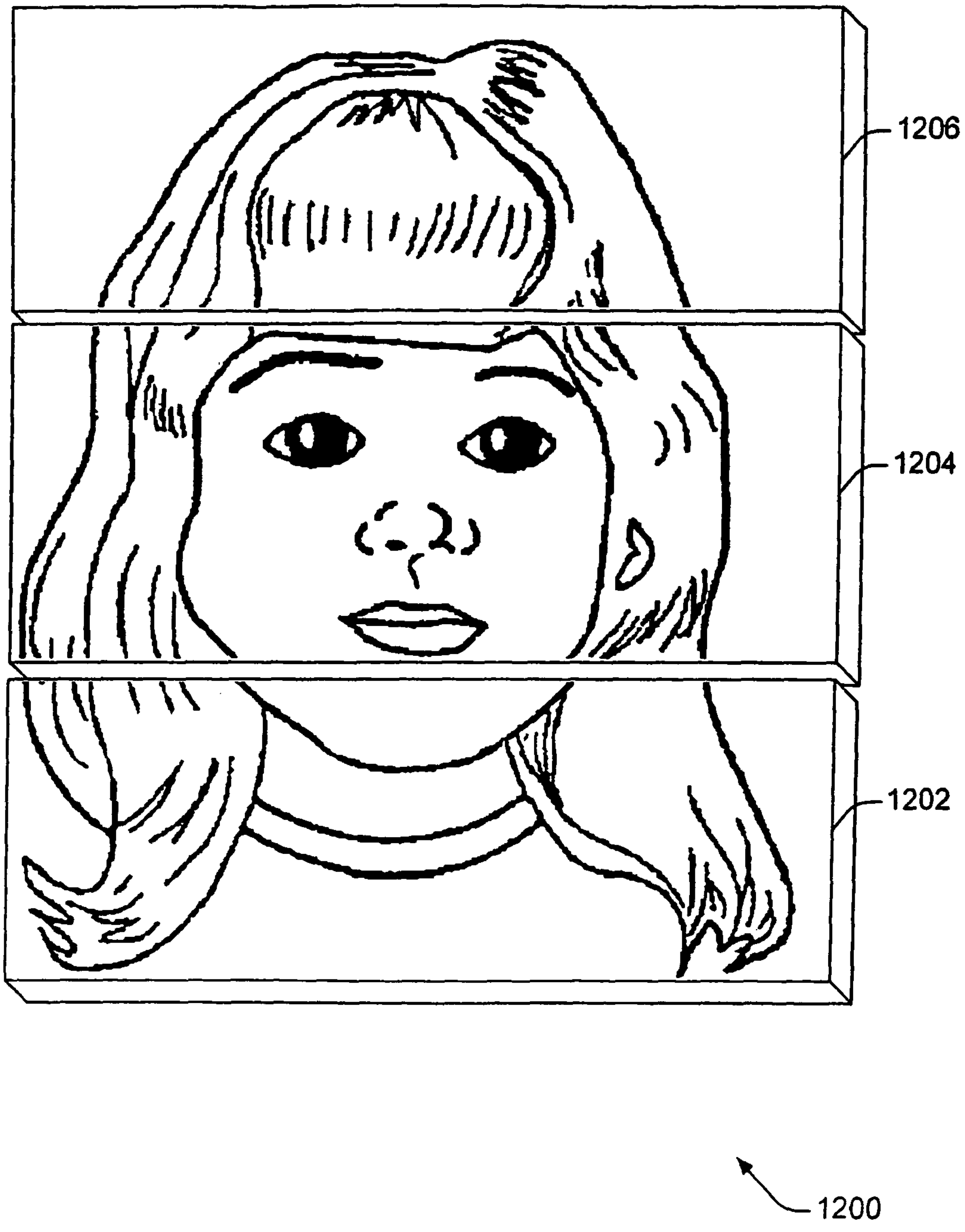
FIG. 12 shows an example of how a virtual display 1200 may be implemented using a plurality of separate display devices.

FIG. 12 shows an example of how a virtual display 1200 may be implemented using a plurality of separate display devices (1202, 1204, 1206). In the example of FIG. 12, the content displayed on the virtual display 1200 corresponds to an image of a woman's face. The virtual display 1200 is implemented using three separate display devices 1206, 1204, 1206, each of which displaying a different portion of the image. In at least one implementation, the original display content (e.g., the image of the woman's face) may be formatted as a single image which may be displayed on a single display. The virtual display module 306 may be configured or designed to provide different portions of the original image to each of the separate display devices (or their respective display controller(s)) to thereby achieve a unified image on the virtual display 1200 which is substantially similar to the original image.

According to a specific implementation, the virtual display technique the present invention may be implemented in a multiple gaming machine environment, wherein selected monitor(s) from each of the gaming machines are "virtualized" to allow them to appear as a virtualized display. Such a feature provides the benefit of enabling new types of player interaction as well as new types of team/tournament play in a gambling environment.

For example, in one implementation, the secondary monitors associated with a bank of gaming machines (such as, for example, bonus game displays) may be utilized as a virtual display for displaying a virtual 3-D environment such as, for example, a virtual aquarium. Each monitor in the virtual display may provide a different viewport into different locations of the 3-D environment. Virtual 3-D objects may also be shown traversing across the monitors of the virtual display. For example, virtual fish could be shown traversing across different monitors of the virtual aquarium as the fish swim from one end of the aquarium to the other. According to a specific implementation, one or more of the gaming machines of the virtualized display may be configured or designed to perform 3-D object management, for example, for managing the appearance and/or movement of objects in the virtual display. At least a portion of the 3-D object management may also be performed by an external device (such as, for example, a 3-D object management system) in communication with one or more of the gaming machines. Additionally, in at least one embodiment, each of the gaming machines may be configured or designed to render its portion of the virtual display content using, for example, appropriate hardware and/or software (such as, for example, an AVP 3-D graphics engine).

It is to be understood that the invention is not limited solely to virtual 3-D aquariums but, rather, may be applied to a vast number of different 2-D/3-D environments and game themes, celebration presentations, promotions, attractions, etc. Additional information relating to 2-D and 3-D rendering techniques is described in U.S. Pat. No. 6,887,157, entitled "VIRTUAL CAMERAS AND 3-D GAMING ENVIRONMENTS IN A GAMING MACHINE", incorporated herein by reference in its entirety for all purposes.

Additional details relating to mechanisms for coordinating and/or managing the display of content across multiple gaming machines are described, for example, in U.S. patent application Ser. No. 11/212,404 entitled, "Gaming System Having Multiple Gaming Devices That Share A Multi-Outcome Display", filed on Aug. 26, 2005, herein incorporated by reference in its entirety for all purposes.

In other implementations, at least a portion of the movable displays associated with a bank of gaming machines may be linked together to provide multi-player gaming features, multi-player bonus features, tournament play features, and/or attracts. For example, in one implementation, selected movable displays from a group of gaming machines may function as bonus displays, and may be linked together to provide for multi-player bonus features. Bonuses may be awarded, for example, based on portions of combined content displayed on the linked bonus displays. In another implementation the linked bonus displays may be configured or designed to work together to reveal desired content on selected bonus displays. For example, the occurrence of a single event may trigger one or more bonus displays to be activated and raised into view for displaying selected content. Alternatively, the occurrence of a combination of events (e.g., either at a single gaming machine or multiple linked gaming machines) may trigger one or more bonus displays to be activated and raised into view for displaying selected content. In at least one implementation, the event(s) which trigger the bonus display(s) may occur at a variety of different sources such as, for example: one or more local gaming machines; remote gaming server(s); remote devices; peripheral device(s) (e.g., a player tracking device); etc. Additionally, in at least one implementation a rules-based process may be used to determine whether one or more specified events have occurred. For example, the rules-based process may be adapted to identify random-based events, target-based events, time-based events, game-based events, player-based events, etc.

In at least one implementation, different eligibility criteria may be used to establish desired eligibility requirements for initiating one or more bonus features (such as, for example, the activating of one or more bonus displays). Such eligibility criteria may relate to a variety of different parameters such as, for example, game play parameters, player parameters, bet or wager amounts, time-based parameters, prior bonus events, etc. For example, in one implementation, the eligibility criteria may be used to establish multiple bonus levels in which different staged awards are revealed (e.g., using at least one movable bonus display) at each different bonus level.

It will be appreciated that the above-described movable display techniques of the present invention may also be implemented in other non-bonus related environments. For example, other types of events which may trigger the activation and/or movement of one or more movable displays may include, for example, game play related events, advertising related events, attraction related events, etc. Additionally, in at least one embodiment, the activation and/or movement of a given movable display is not directly controllable by the player. For example, in at least one implementation the player is not able to control the activation and/or movement of a given movable display as he or she desires. Rather, the movable display may be activated and/or moved based on: 1) the occurrence of one or more specified events specified and/or 2) the satisfying of specified eligibility criteria, wherein at least a portion of such events/criteria is not within the player's control.

Returning to the example of FIG. 3, another feature which may be provided by the movable display controller 350 is the ability to control the movement or motion of one or more movable displays 350. For example, as illustrated in FIG. 3, movable display controller 350 may include a motion control module 314 for controlling the movement or motion of movable displays 350. In this example, the movement of displays 310 may be achieved using a plurality of motion control devices 320. According to different embodiments, each motion control device may be adapted to control the movement of one or more displays. In the example of FIG. 3, the movement of each of the displays 310 may be independently controlled via a respective motion control device.

According to a specific embodiment, the motion control devices 320 may be implemented using any number of different drive mechanisms (either open or closed loop) for translating the movable displays. These drive mechanisms may include, but are not limited to, ballscrew and jacknut devices, belt and pulley devices, electromagnetic linear drive mechanisms, cam and follower devices, gear drives, leadscrews, etc. The drivers for such systems may include, for example, stepper motors, server motors, gear motors, pneumatic drivers, etc. Each of the different types of drivers may be implemented either with or without mechanical and electromechanical encoders and other feedback technologies, as desired.

If desired, position sensing devices (such as, for example, microswitches) may be used to monitor the positions of the movable displays 310 and to provide feedback to the motion control devices 320, motion control module 314, and/or other components of the movable display controller 350.

According to one embodiment, it may be desirable to hide or minimize the viewable portions of the motion control devices 320 from the player and/or spectators. For example, as illustrated in FIG. 1. the motion control devices associated with moving displays 50 may be located within the body of top box 6. Alternatively, the motion control devices may be displayed to the player and either themed into the game itself, or camouflaged to the extent possible to minimize its visual intrusion. In addition to hiding the motion control devices, it may be desirable at times to also hide the movable displays. For example, referring to the gaming machine of FIG. 1, in one embodiment one or more of the moving displays 50 may be hidden from view of the player (e.g., within the body of top box 6) during specific portions of the game play and/or bonus round(s), and extended for viewing during other portions of the game play and/or bonus round.

According to specific embodiments, the motion control devices may be configured or designed to provide linear and/or non-linear motion to the movable displays. Additionally the motion control devices may be configured or designed to translate the movable displays in one, two, or three dimensions.

Figure 8:
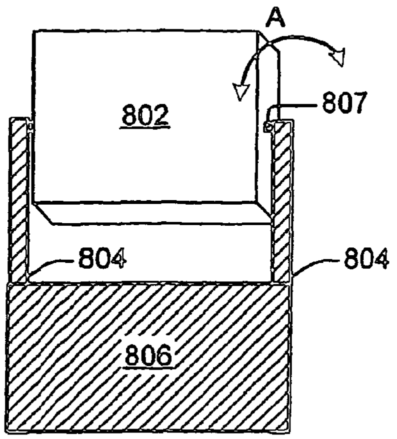
FIGS. 8-11 provide illustrative examples of different types of motion control device embodiments which may be used for implementing various aspects of the present invention.

FIGS. 8-11 provide illustrative examples of different types of motion control device embodiments which may be used for implementing various aspects of the present invention. For example, FIG. 8 shows a specific embodiment of a linear-type motion control device which may be used for imparting motion to display 802. As illustrated in FIG. 8, the motion control device may include a frame portion 806. In one implementation, the frame of portion 806 may include a cavity for housing display 802 (e.g., when the display is in a lowered or parked position) so that the display may be hidden from view. The motion control device may also include extendable/retractable arms 804 adapted to raise and/or lower display 802. In one implementation the arms 804 may be coupled to a drive mechanism (not shown) which drives the movement of the arms 804. Additionally, if desired, display 802 may be pivotally attached to arms 804 to allow the display 802 to be rotated or pivoted to a desired angle. For example, display 802 may be rotated about pivot 807 to position the display at an angle which provides an improved view of the display to the player below. In at least one implementation, a separate drive mechanism may be used for providing pivotal motion to display 802.

Figure 9:
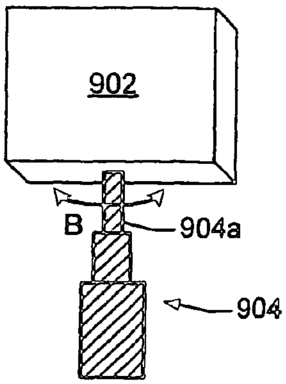

FIG. 9 shows an alternate embodiment of a motion control device 904 which may be used for imparting motion to display 902. In the embodiment of FIG. 9, motion control device 904 includes a telescoping arm adapted to raise and/or lower display 902. Additionally, in at least one implementation, the motion control device 904 may be adapted to turn or rotate display 902. For example, in the embodiment of FIG. 9, the top portion 904*a* of the telescoping arm may be adapted to rotate in either a clockwise or counterclockwise direction to thereby impart rotational motion to display in 902 (as illustrated, for example, by directional arrow B).

Figure 10:
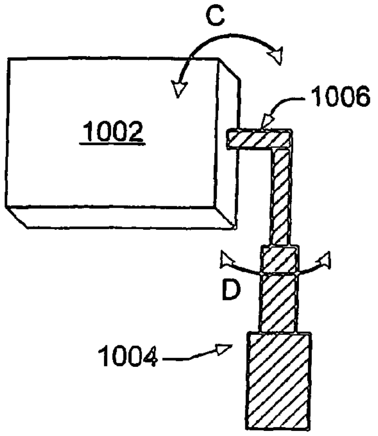

FIG. 10 shows an alternate embodiment of a motion control device 1004 which may be used for imparting motion to display 1002. In the embodiment of FIG. 10, motion control device 1004 includes a telescoping arm adapted to raise and/or lower display 1002. In at least one implementation, display 1002 may be pivotally attached to the telescoping arm via pivot mechanism 1006 to allow the display 1002 to be pivoted or rotated about the pivot mechanism (as illustrated, for example, by directional arrow C) to allow the display to be pivoted to a desired angle. Further, if desired, the telescoping arm may be adapted to turn in either a clockwise or counterclockwise direction to thereby impart motion to display 1002 as illustrated, for example, by directional arrow D.

Figure 11:
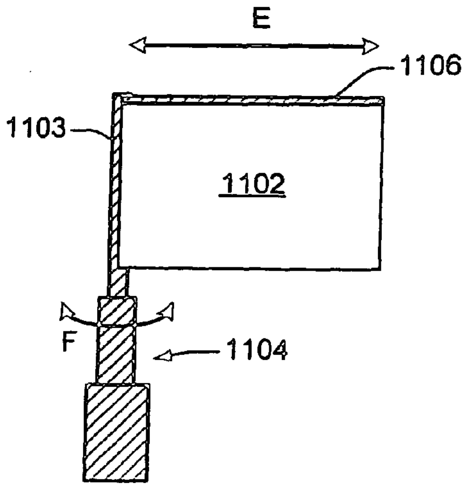

FIG. 11 shows an alternate embodiment of a motion control device 1104 which may be used for imparting motion to display 1102. In the embodiment of FIG. 11, motion control device 1104 includes a telescoping arm adapted to raise and/or lower display 1102. In one implementation, display 1102 may be implemented as a flexible, scroll-type OLED display which may be housed (e.g., in retracted position) within the interior of arm portion 1103. An extendable/retractable arm 1106 may be employed to "unroll" the display into its fully extended position. An additional retraction mechanism (not shown) may also be employed when retracting the display 1102 to help ensure that the display is retracted properly. If desired, the telescoping arm may be adapted to turn in either a clockwise or counterclockwise direction to thereby impart motion to display 1102 as illustrated, for example, by directional arrow F.

In at least one embodiment, the movable displays of the present invention may be utilized to form a display tower. Examples of different display tower implementations are shown, for example, in FIGS. 4-7 of the drawings. For purposes of illustration and in order to avoid confusion, the movable display configurations of FIGS. 4-7 are illustrated without reference to other associated components of the movable display system (such as, for example, gaming machine components, display controller components, motion control components, etc.).

Figure 4A:
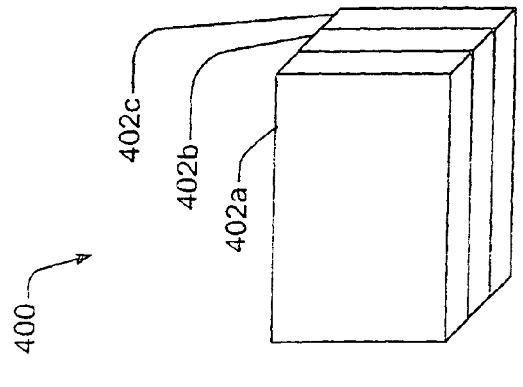
FIGS. 4A-D illustrate a specific implementation for utilizing multiple movable displays to form a display tower.
Figure 4B:
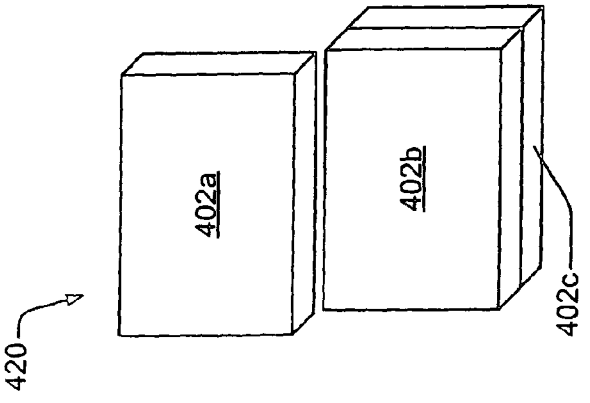
Figure 4C:
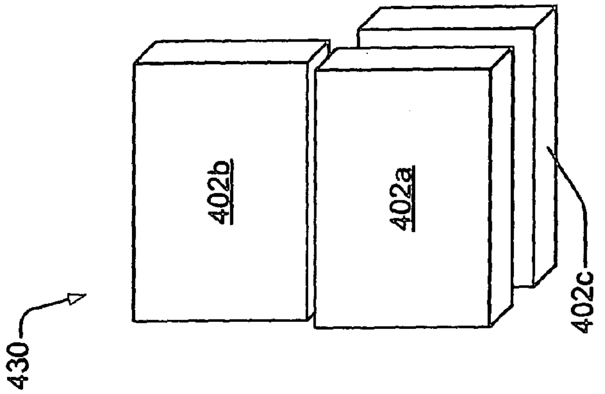
Figure 4D:
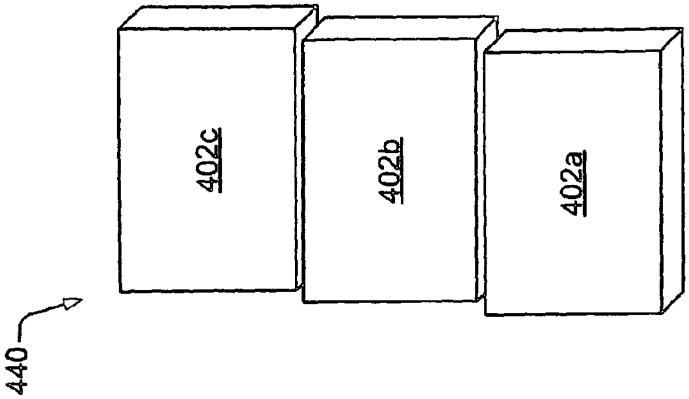

FIGS. 4A-D illustrate a specific implementation for utilizing multiple movable displays to form a display tower. In one implementation, the movable displays 400 of FIG. 4A may correspond to movable displays 50 of the gaming machine embodiment of FIG. 1. As illustrated in FIG. 4A, several movable displays 402*a*, 402*b*, 402*c* may be positioned adjacent to each other at substantially the same height. Using this configuration, the displays may be housed within the gaming machine body or top box, and hidden from view of the player. Alternatively, display 402*a* may be viewable by the player, and displays 402*b* and 402*c* obscured from the player's view by display 402*a*. In FIG. 4B, movable display 402*a* is moved upward until it is positioned above the other displays. Such a configuration may be used, for example, during game play and/or bonus play when it is desired to present the player with an additional display (e.g., 402*a*) while allowing other movable displays (e.g., 402*b* and 402*c*) to remain hidden from view. In FIG. 4C, movable display 402*b* is moved upward until it is positioned above (and, for example, slightly behind) display 402*a*. Using the configuration of FIG. 4C, displays 402*a* and 402*b* may be used as active displays, while display 402*c* is inactive. In FIG. 4D, movable display 402*b* is moved upward until it is positioned above display 402*a*, and movable display 402*c* is moved upward until it is positioned above display 402*b*, thereby forming a 3-unit display tower. In at least one implementation, each of the movable displays may be configured or designed to be raised/lowered independently, as desired.

Figure 7:
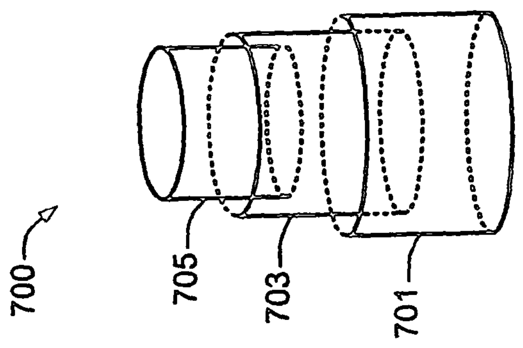
FIGS. 5-7 illustrate example of other movable display configurations in accordance with different embodiments of the present invention.
Figure 6:
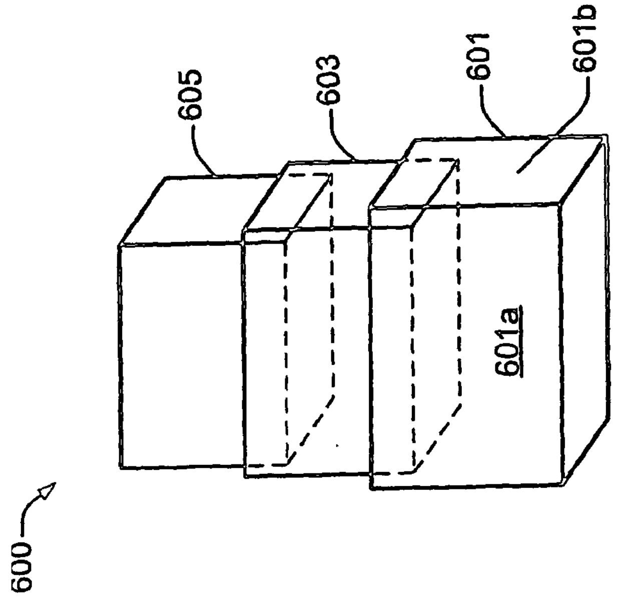
Figure 5:
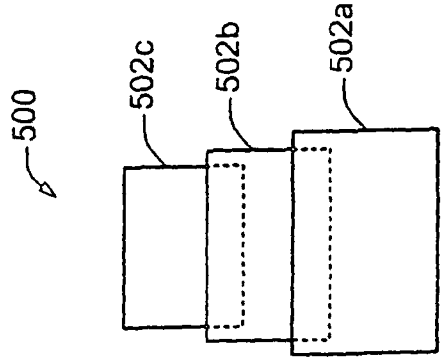

FIGS. 5-7 illustrate example of other movable display configurations in accordance with different embodiments of the present invention. For example, FIG. 5 shows an example of a telescoping movable display tower 500 which includes multiple displays (e.g., 502*a*, 502*b*, 502*c*) of differing dimensions. Such a configuration may be useful, for example, in situations where it is desirable to reduce the volume occupied by the movable displays. For example, display 502*b* may include a frame having a cavity large enough to house displays 502*c*, and display 502*a* may include a frame having a cavity large enough to house displays 502*b*. Using this configuration, the displays may be housed or stacked (e.g., when in lowered or parked position) within the volume occupied by the frame of display 502*a*.

As stated previously, the movable displays of the present invention may be implemented utilizing a variety of different display technologies such as, for example: flat panel displays (FPDs), LED displays, plasma displays, field emission displays, digital micromirror devices (DMD), LCD displays, Organic Light-Emitting Diode (OLED) displays, Light-Emitting Polymer (LEP) displays, CRT displays, etc. In at least one implementation, a movable display may be implemented as a 1-sided display device which provides a single, viewable display. However, in alternate embodiments, one or more movable displays may be implemented as multi-sided display device which provides multiple viewable displays in a single display device. An example of such display devices as illustrated in FIG. 6 of the drawings.

FIG. 6 illustrate a specific implementation of a multi-side movable display tower which may be used for implementing various aspects of the present invention. In the example of FIG. 6 display tower 600 includes several multi-sided display devices, namely movable display devices 601, 603, and 605. In this example, each of the display devices is configured as a 4-sided display device which may include up to 4 separate display regions (e.g., one display region on each side). Thus, for example, the telescoping display tower 600 of FIG. 6 may include up to 12 separate display regions, which, for example, may be implemented using 12 separate display screens. In at least one implementation, each of the display regions of display tower 600 may be used to display desired content using, for example, one or more techniques described previously with respect to FIGS. 1-3 of the drawings. It will be appreciated that one advantage of providing display regions on multiple sides of a display device is that it enables viewers to view content displayed on the display device from any desired direction.

Although the example of FIG. 6 illustrates a 4-sided rectangular movable display device with multiple display regions, it will be appreciated that the multi-sided display movable device of the present invention may include any desired number of sides, shapes, and display regions. For example, one of movable display device embodiment may include three rectangular-shaped display regions arranged in a triangular-type configuration. Another movable display device embodiment may include, for example, 4 triangular-shaped display regions arranged in a pyramid-type configuration. In yet another embodiment, the movable display device may include two viewable display regions on opposite sides of the display device. Such an embodiment may be implemented, for example, using two separate LCD display screens, or, alternatively may be implemented using a single OLED display screen which is configured or designed to be viewable from both sides.

Another example of a movable display tower embodiment is illustrated in FIG. 7 of the drawings. In the example of FIG. 7, the movable display tower 700 includes three cylindrically-shaped movable display devices 701, 703, 705. In at least one implementation, each of the movable display devices 701, 703, 705 may include one or more curved display regions on the exterior surface of the display device. In one implementation, a cylindrically-shaped display may be formed using an OLED-type display screen.

As illustrated in FIGS. 6 and 7, the telescoping movable display towers 600, 700 may each include multiple display devices of differing dimensions. Such configurations may be useful in situations where it is desirable to reduce the volume occupied by the movable displays devices. For example, as shown in FIG. 6, movable display device 605 is designed to fit within the cavity defined by movable display device 603, and movable display device 603 is designed to fit within the cavity defined by movable display device 601.

It can be seen from the above examples that the overall height, surface area and/or volume of a gaming machine employing the movable display technique the present invention may repeatedly and dynamically change as each movable display (or movable display device) is raised or lowered.

According to different embodiments, the movable display devices of the present invention may be utilized to serve a variety of different functions. For example, in one implementation, a series of movable displays may be adapted to function as telescoping video bonus tower. In a different implementation, the bottom-most display may be utilized as the main or primary display where the game is played. When a bonus is awarded, additional movable displays are deployed upward, telescoping into a bonus topper tower. In yet another implementation, the bottom two video displays function as the primary display and the top-glass pay table, respectively. When a bonus is awarded, additional displays may be movably deployed upward, telescoping into a bonus topper tower.

The technique of the present invention may also be applied to other components of a gaming machine (e.g., mechanical wheel windows, ball rotating pointers, mechanical bonus toppers, etc.) by providing motion to such components in order to enable the gaming machine to dynamically change its volume as desired.

The simple act of raising and lowering the tower is an impressive and entertaining event. Accordingly, it will be appreciated that one advantage of the movable display technique of the present invention is that it provides extremely dramatic, and visually stimulating presentation capabilities. Additionally, the technique of the present invention may facilitate a unique anticipation to build (e.g., in the player and/or spectators) as the series of movable displays arise one by one.

In at least one implementation,

Another advantage is that the use of multiple movable displays provides for additional room for the display of desired information. For example, by graphically linking all or selected displays in the display tower, one is able to create an extraordinarily large monolithic image which is not achievable by conventional gaming machine display techniques. This is illustrated, for example, in FIG. 12 drawings, described previously. Additionally, a large format display tower has the potential to be viewed from great distances and attract attention throughout a casino. Moreover, the technique of the present invention may be scaled to accommodate a range of heights and widths, depending upon the desired affect and/or architectural limitations.

Gaming System

Figure 13:
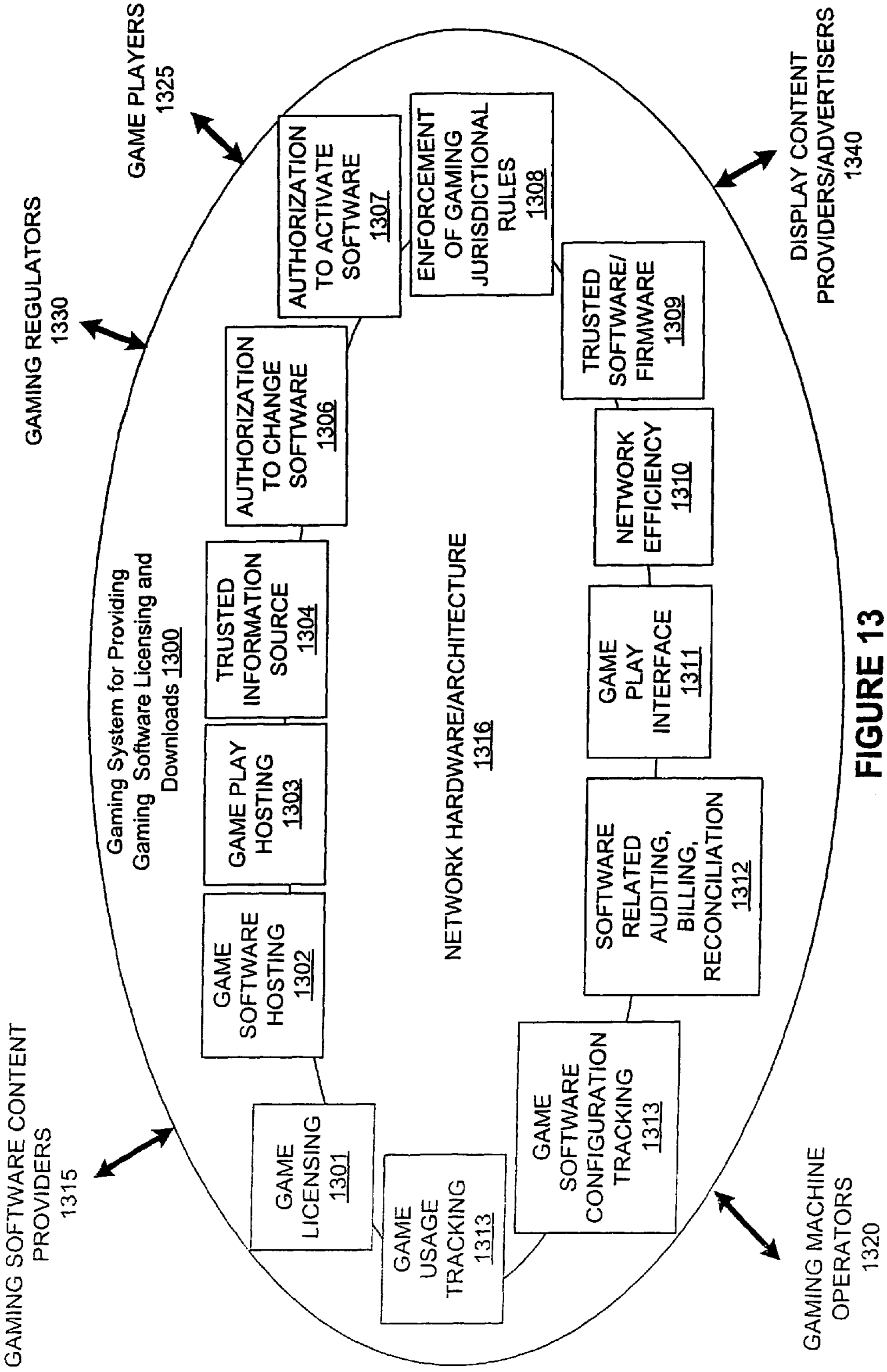
FIG. 13 shows a block diagram illustrating components of a gaming system 1300 which may be used for implementing various aspects of the present invention.

FIG. 13 shows a block diagram illustrating components of a gaming system 1300 which may be used for implementing various aspects of the present invention. In FIG. 13, the components of a gaming system 1300 for providing game software licensing and downloads are described functionally. The described functions may be instantiated in hardware, firmware and/or software and executed on a suitable device. In the system 1300, there may be many instances of the same function, such as multiple game play interfaces 1311. Nevertheless, in FIG. 13, only one instance of each function is shown. The functions of the components may be combined. For example, a single device may comprise the game play interface 1311 and include trusted memory devices or sources 1309.

The gaming system 1300 may receive inputs from different groups/entities and output various services and or information to these groups/entities. For example, game players 1325 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 1300, receive revenue for the use of their software and compensate the gaming machine operators. The gaming regulators 1330 may provide rules and regulations that must be applied to the gaming system and may receive reports and other information confirming that rules are being obeyed. Content providers and/or advertisers 1340 may provide content to be displayed on selected displays of the gaming system. Such displays may include, for example, movable displays of one or more gaming machines.

In the following paragraphs, details of each component and some of the interactions between the components are described with respect to FIG. 13. The game software license host 1301 may be a server connected to a number of remote gaming devices that provides licensing services to the remote gaming devices. For example, in other embodiments, the license host 1301 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1315 may track the usage of game software on a plurality of devices in communication with the host. The game usage-tracking host 1315 may be in communication with a plurality of game play hosts and gaming machines. From the game play hosts and gaming machines, the game usage tracking host 1315 may receive updates of an amount that each game available for play on the devices has been played and on amount that has been wagered per game. This information may be stored in a database and used for billing according to methods described in a utility based licensing agreement.

The game software host 1302 may provide game software downloads, such as downloads of game software or game firmware, to various devious in the game system 1300. For example, when the software to generate the game is not available on the game play interface 1311, the game software host 1302 may download software to generate a selected game of chance played on the game play interface. Further, the game software host 1302 may download new game content to a plurality of gaming machines via a request from a gaming machine operator.

In one embodiment, the game software host 1302 may also be a game software configuration-tracking host 1313. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 1303 may be a host server connected to a plurality of remote clients that generates games of chance that are displayed on a plurality of remote game play interfaces 1311. For example, the game play host device 1303 may be a server that provides central determination for a bingo game play played on a plurality of connected game play interfaces 1311. As another example, the game play host device 1303 may generate games of chance, such as slot games or video card games, for display on a remote client. A game player using the remote client may be able to select from a number of games that are provided on the client by the host device 1303. The game play host device 1303 may receive game software management services, such as receiving downloads of new game software, from the game software host 1302 and may receive game software licensing services, such as the granting or renewing of software licenses for software executed on the device 1303, from the game license host 1301.

In particular embodiments, the game play interfaces or other gaming devices in the gaming system 1300 may be portable devices, such as electronic tokens, cell phones, smart cards, tablet PC's and PDA's. The portable devices may support wireless communications and thus, may be referred to as wireless mobile devices. The network hardware architecture 1316 may be enabled to support communications between wireless mobile devices and other gaming devices in gaming system. In one embodiment, the wireless mobile devices may be used to play games of chance.

The gaming system 1300 may use a number of trusted information sources. Trusted information sources 1304 may be devices, such as servers, that provide information used to authenticate/activate other pieces of information. CRC values used to authenticate software, license tokens used to allow the use of software or product activation codes used to activate to software are examples of trusted information that might be provided from a trusted information source 1304. Trusted information sources may be a memory device, such as an EPROM, that includes trusted information used to authenticate other information. For example, a game play interface 1311 may store a private encryption key in a trusted memory device that is used in a private key-public key encryption scheme to authenticate information from another gaming device.

When a trusted information source 1304 is in communication with a remote device via a network, the remote device will employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in U.S. publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 1300 of the present invention may include devices 1306 that provide authorization to download software from a first device to a second device and devices 1307 that provide activation codes or information that allow downloaded software to be activated. The devices, 1306 and 1307, may be remote servers and may also be trusted information sources. One example of a method of providing product activation codes that may be used with the present invention is describes in previously incorporated U.S. Pat. No. 6,264,561.

A device 1306 that monitors a plurality of gaming devices to determine adherence of the devices to gaming jurisdictional rules 1308 may be included in the system 1300. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1300 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 1316 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 1310 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 1312. For example, a software licensing billing server may generate a bill for a gaming device operator based upon a usage of games over a time period on the gaming devices owned by the operator. In another example, a software auditing server may provide reports on game software downloads to various gaming devices in the gaming system 1300 and current configurations of the game software on these gaming devices.

At particular time intervals, the software auditing server 1312 may also request software configurations from a number of gaming devices in the gaming system. The server may then reconcile the software configuration on each gaming device. In one embodiment, the software auditing server 1312 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 13. Many of the interactions are coupled. For example, methods used for game licensing may affect methods used for game downloading and vice versa. For the purposes of explanation, details of a few possible interactions between the components of the system 1300 relating to software licensing and software downloads have been described. The descriptions are selected to illustrate particular interactions in the game system 1300. These descriptions are provided for the purposes of explanation only and are not intended to limit the scope of the present invention.

Other Embodiments

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to dynamically change its volume.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to dynamically change its volume; and wherein the gaming machine is configured or designed to dynamically change its volume by moving the first movable display.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to:

dynamically change its volume;

receive a wager on a game of chance;

generate an outcome for the game of chance; and dispense money or an indicia of credit for a monetary value in response to the outcome.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to dynamically change its volume; and wherein the volume of the gaming machine corresponds to a physical space defined by a plurality of exterior surfaces of the gaming machine.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to dynamically change its viewable surface area by moving the first movable display.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

a first display controller for controlling content displayed on the first movable display; and a first motion controller for controlling movement of the first movable display.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to:

dynamically change its volume;

dynamically move the first movable display to a first position to thereby establish a first volume of the gaming machine; and dynamically move the first movable display to a second position to thereby establish a second volume of the gaming machine;

wherein the first volume is different than the second volume.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

a second movable display;

wherein the gaming machine is configured or designed to dynamically move the first movable display to a first position; and wherein the gaming machine is configured or designed to dynamically move the second movable display to a second position.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

a second movable display;

wherein the gaming machine is configured or designed to dynamically move the first movable display to a first position;

wherein the gaming machine is configured or designed to dynamically move the second movable display to a second position; and wherein the first and second movable displays are positioned to form a display tower;

the display tower being adapted to dynamically change its volume by moving at least one of the movable displays.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

a second movable display;

wherein the gaming machine is configured or designed to raise the first display during bonus play to reveal a first portion of bonus content; and wherein the gaming machine is configured or designed to raise the second display during bonus play to reveal a second portion of bonus content.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to:

detect the occurrence of a first event; and initiate motion of the first movable display in response to detecting the first event.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to: detect the occurrence of a first event; and initiate motion of the first movable display in response to detecting the first event;

wherein the first event corresponds to a game-related event.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include: at least one processor;

at least one interface;

memory; and a first movable display;

wherein the gaming machine is configured or designed to: detect the occurrence of a first event; and initiate motion of the first movable display in response to detecting the first event;

wherein the first event corresponds to a bonus-related event.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to:

detect the occurrence of a first event; and initiate motion of the first movable display in response to detecting the first event;

wherein the first event occurs at the gaming machine.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to:

detect the occurrence of a first event; and initiate motion of the first movable display in response to detecting the first event;

wherein the first event occurs at a remote device.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory; and a first movable display;

wherein the gaming machine is configured or designed to:

detect the occurrence of a first event; and initiate motion of the first movable display in response to detecting the first event;

wherein the first event corresponds to at least one of: random-based events, target-based events, time-based events, game-based events, and player-based events.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

a second movable display;

wherein the gaming machine is configured or designed to:

detect the occurrence of a first event;

initiate motion of the first movable display in response to detecting the first event;

detect the occurrence of a second event; and initiate motion of the second movable display in response to detecting the second event.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

wherein the gaming machine is configured or designed to:

automatically move the first movable display to a first position; and display a first portion of content on the first movable display;

wherein the first portion of content corresponds to content relating to the game of chance.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

wherein the gaming machine is configured or designed to:

automatically move the first movable display to a first position; and display a first portion of content on the first movable display;

wherein the first portion of content corresponds to content relating to bonus play.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

automatically move the first movable display to a first position; and display a first portion of content on the first movable display;

wherein the first portion of content is provided from a remote device.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

wherein the gaming machine is configured or designed to:

automatically move the first movable display to a first position; and display a first portion of content on the first movable display;

wherein the first portion of content is provided from an advertiser.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

a second movable display;

wherein the gaming machine is configured or designed to:

automatically move the first movable display to a first position;

automatically move the second movable display to a second position;

display a first portion of content on the first movable display; and display a second portion of content on the second movable display.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface; memory;

a first movable display;

a second movable display;

a virtual display controller configured or designed to implement a virtualized display for displaying virtualized content using at least the first movable display and the second movable display;

wherein the gaming machine is configured or designed to:

display a first portion of the virtualized content on the first movable display; and display a second portion of the virtualized content on the second movable display.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

a second movable display;

a virtual display controller configured or designed to implement a virtualized display for displaying virtualized content using at least the first movable display and the second movable display;

wherein the gaming machine is configured or designed to:

display a first rendered image of the virtual environment on the first movable display; and display a second rendered image of the virtual environment on the second movable display.

In at least one embodiment, various aspects of the present invention are directed to different methods, gaming machines, bonus devices, systems, and computer program products for operating a gaming machine adapted to receive a wager on a game of chance. In at, least one implementation, the gaming machine of the present invention may include: at least one processor;

at least one interface;

memory;

a first movable display;

a second movable display;

a virtual display controller configured or designed to implement a virtualized display for displaying rendered images of a virtual environment using at least the first movable display and the second movable display;

wherein the gaming machine is configured or designed to:

display a first rendered image of the virtual environment on the first movable display; and display a second rendered image of the virtual environment on the second movable display; and display a virtual object traversing from first rendered image of the virtual environment to the second rendered image of the virtual environment.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

a second movable display;

a virtual display controller configured or designed to implement a virtualized display for displaying rendered images of a virtual environment using at least the first movable display and the second movable display;

wherein the gaming machine is configured or designed to:

display a first rendered image of the virtual environment on the first movable display; and display a second rendered image of the virtual environment on the second movable display; and wherein the virtual environment corresponds to a virtual 3-D environment.

In at least one embodiment, various aspects of the present invention are directed to different methods, gaming machines, bonus devices, systems, and computer program products for operating a gaming machine adapted to receive a wager on a game of chance. In at least one implementation, the gaming machine of the present invention may include:

at least one processor;

at least one interface;

memory;

a first movable display;

a second movable display;

a virtual display controller configured or designed to divide display content comprising a still image or a sequence of images between at least two displays;

the gaming machine being configured or designed to:

display a first portion of the display content on the first movable display; and display a second portion of the display content on the second movable display.

In at least one embodiment, various aspects of the present invention are directed to different methods, gaming machines, bonus devices, systems, and computer program products for operating a gaming system including a plurality of gaming machines each adapted to receive a wager on a game of chance. In at least one implementation, the gaming system of the present invention may include:

a first gaming machine having a first movable display;

a second gaming machine having a second movable display; and at least one controller configured or designed to coordinate movement of the first and second movable displays in order to facilitate multi-player features.

In at least one embodiment, various aspects of the present invention are directed to different methods, gaming machines, bonus devices, systems, and computer program products for operating a gaming system including a plurality of gaming machines each adapted to receive a wager on a game of chance. In at least one implementation, the gaming system of the present invention may include:

a first gaming machine having a first movable display;

a second gaming machine having a second movable display; and at least one controller configured or designed to coordinate movement of the first and second movable displays in order to facilitate multi-player features;

wherein the at least one controller is further configured or designed to coordinate content displayed on the first and second movable displays in order to facilitate multi-player features.

In at least one embodiment, various aspects of the present invention are directed to different methods, gaming machines, bonus devices, systems, and computer program products for operating a gaming system including a plurality of gaming machines each adapted to receive a wager on a game of chance. In at least one implementation, the gaming system of the present invention may include:

a first gaming machine having a first movable display;

a second gaming machine having a second movable display; and at least one controller configured or designed to coordinate movement of the first and second movable displays in order to facilitate multi-player features;

wherein the multi-player features include at least one of: multi-player game play features, multi-player bonus features, and tournament gaming play features.

In at least one embodiment, various aspects of the present invention are directed to different methods, gaming machines, bonus devices, systems, and computer program products for operating a gaming system including a plurality of gaming machines each adapted to receive a wager on a game of chance. In at least one implementation, the gaming system of the present invention may include:

a first gaming machine having a first movable display;

a second gaming machine having a second movable display; and at least one controller configured or designed to coordinate movement of the first and second movable displays in order to facilitate multi-player features;

a virtual display controller configured or designed to implement a virtualized display for displaying virtualized content using at least the first movable display and the second movable display;

the gaming system being configured or designed to:

display a first portion of the virtualized content on the first movable display; and display a second portion of the virtualized content on the second movable display.

In at least one embodiment, various aspects of the present invention are directed to different methods, gaming machines, bonus devices, systems, and computer program products for operating a gaming system including a plurality of gaming machines each adapted to receive a wager on a game of chance. In at least one implementation, the gaming system of the present invention may include:

a first gaming machine having a first movable display;

a second gaming machine having a second movable display; and at least one controller configured or designed to coordinate movement of the first and second movable displays in order to facilitate multi-player features;

a virtual display controller configured or designed to implement a virtualized display for displaying a virtual environment using at least the first movable display and the second movable display;

the gaming system being configured or designed to:

display a first portion of the virtual environment on the first movable display; and display a second portion of the virtual environment on the second movable display.

In at least one embodiment, various aspects of the present invention are directed to different methods, gaming machines, bonus devices, systems, and computer program products for operating a gaming system including a plurality of gaming machines each adapted to receive a wager on a game of chance. In at least one implementation, the gaming system of the present invention may include:

a first gaming machine having a first movable display;

a second gaming machine having a second movable display; and at least one controller configured or designed to coordinate movement of the first and second movable displays in order to facilitate multi-player features;

a virtual display controller configured or designed to implement a virtualized display for displaying a virtual environment using at least the first movable display and the second movable display;

the gaming system being configured or designed to:

display a first portion of the virtual environment on the first movable display; and display a second portion of the virtual environment on the second movable display;

wherein the virtual environment corresponds to a virtual 3-D environment.

In at least one embodiment, various aspects of the present invention are directed to different methods, gaming machines, bonus devices, systems, and computer program products for operating a gaming system including a plurality of gaming machines each adapted to receive a wager on a game of chance. In at least one implementation, the gaming system of the present invention may include:

a first gaming machine having a first movable display;

a second gaming machine having a second movable display; and at least one controller configured or designed to coordinate movement of the first and second movable displays in order to facilitate multi-player features;

a virtual display controller configured or designed to implement a virtualized display for displaying a virtual environment using at least the first movable display and the second movable display;

the gaming system being configured or designed to:

display a first portion of the virtual environment on the first movable display; and display a second portion of the virtual environment on the second movable display;

display a virtual object traversing across the first and second portions of the virtual environment.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

wherein the first volume is different than the second volume.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

receiving a wager on a game of chance;

generating an outcome for the game of chance; and dispensing money or an indicia of credit for a monetary value in response to the outcome.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

wherein a volume of the gaming machine corresponds to a physical space defined by a plurality of exterior surfaces of the gaming machine.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

dynamically changing a viewable surface area of the gaming machine by moving the first movable display.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

wherein the gaming machine includes a second movable display, the method further comprising:

dynamically moving the first movable display to a first position; and dynamically moving the second movable display to a second position.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

wherein the first and second movable displays are positioned to form a display tower.

In at least one embodiment, various aspects of the present invention are directed to different methods, gaming machines, bonus devices, systems, and computer program products for operating a gaming machine which is adapted to receive a wager on a game of chance and includes a first movable display and a second movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

raising the first display during bonus play to reveal a first portion of bonus content; and raising the second display during bonus play to reveal a second portion of bonus content.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

detecting the occurrence of a first event; and initiating motion of the first movable display in response to detecting the first event.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

detecting the occurrence of a first event; and initiating motion of the first movable display in response to detecting the first event;

wherein the first event corresponds to a game-related event.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

detecting the occurrence of a first event; and initiating motion of the first movable display in response to detecting the first event;

wherein the first event corresponds to a bonus-related event.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

detecting the occurrence of a first event; and initiating motion of the first movable display in response to detecting the first event;

wherein the first event occurs at the gaming machine.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

detecting the occurrence of a first event; and initiating motion of the first movable display in response to detecting the first event;

wherein the first event occurs at a remote device.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

detecting the occurrence of a first event; and initiating motion of the first movable display in response to detecting the first event;

wherein the first event corresponds to at least one of: random-based events, target-based events, time-based events, game-based events, and player-based events.

In at least one embodiment, various aspects of the present invention are directed to different methods, gaming machines, bonus devices, systems, and computer program products for operating a gaming machine which is adapted to receive a wager on a game of chance and includes a first movable display and a second movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

detecting the occurrence of a first event;

initiating motion of the first movable display in response to detecting the first event;

detecting the occurrence of a second event; and initiating motion of the second movable display in response to detecting the second event.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

automatically moving the first movable display to a first position; and displaying a first portion of content on the first movable display;

wherein the first portion of content corresponds to content relating to the game of chance.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

automatically moving the first movable display to a first position; and displaying a first portion of content on the first movable display;

wherein the first portion of content corresponds to content relating to bonus play.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

automatically moving the first movable display to a first position; and displaying a first portion of content on the first movable display;

wherein the first portion of content is provided from a remote device.

In at least one embodiment, various aspects of the present invention are directed to different methods, gaming machines, bonus devices, systems, and computer program products for operating a gaming machine which is adapted to receive a wager on a game of chance and includes a first movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

automatically moving the first movable display to a first position; and displaying a first portion of content on the first movable display;

wherein the first portion of content is provided from an advertiser.

In at least one embodiment, various aspects of the present invention are directed to different methods, gaming machines, bonus devices, systems, and computer program products for operating a gaming machine which is adapted to receive a wager on a game of chance and includes a first movable display and a second movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

automatically moving the first movable display to a first position;

automatically moving the second movable display to a second position;

displaying a first portion of content on the first movable display; and displaying a second portion of content on the second movable display.

In at least one embodiment, various aspects of the present invention are directed to different methods, gaming machines, bonus devices, systems, and computer program products for operating a gaming machine which is adapted to receive a wager on a game of chance and includes a first movable display, a second movable display, and a virtual display controller configured or designed to implement a virtualized display for displaying virtualized content using at least the first movable display and the second movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

displaying a first portion of the virtualized content on the first movable display; and displaying a second portion of the virtualized content on the second movable display.

In at least one embodiment, various aspects of the present invention are directed to different methods, gaming machines, bonus devices, systems, and computer program products for operating a gaming machine which is adapted to receive a wager on a game of chance and includes a first movable display, a second movable display, and a virtual display controller configured or designed to implement a virtualized display for displaying rendered images of a virtual environment using at least the first movable display and the second movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

displaying a first rendered image of the virtual environment on the first movable display; and displaying a second rendered image of the virtual environment on the second movable display.

In at least one embodiment, various aspects of the present invention are directed to different methods, gaming machines, bonus devices, systems, and computer program products for operating a gaming machine which is adapted to receive a wager on a game of chance and includes a first movable display, a second movable display, and a virtual display controller configured or designed to implement a virtualized display for displaying rendered images of a virtual environment using at least the first movable display and the second movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

displaying a first rendered image of the virtual environment on the first movable display; and displaying a second rendered image of the virtual environment on the second movable display;

displaying a virtual object traversing from first rendered image of the virtual environment to the second rendered image of the virtual environment.

In at least one embodiment, various aspects of the present invention are directed to different methods, gaming machines, bonus devices, systems, and computer program products for operating a gaming machine which is adapted to receive a wager on a game of chance and includes a first movable display, a second movable display, and a virtual display controller configured or designed to implement a virtualized display for displaying rendered images of a virtual environment using at least the first movable display and the second movable display. In at least one implementation, the technique of the present invention may include:

dynamically moving the first movable display to a first position to thereby establish a first volume of the gaming machine;

dynamically moving the first movable display to a second position to thereby establish a second volume of the gaming machine;

displaying a first rendered image of the virtual environment on the first movable display; and displaying a second rendered image of the virtual environment on the second movable display;

wherein the virtual environment corresponds to a virtual 3-D environment.

In at least one embodiment, various aspects of the present invention are directed to different methods, gaming machines, bonus devices, systems, and computer program products for operating a gaming system including a plurality of gaming machines each adapted to receive a wager on a game of chance, wherein the plurality of gaming machines includes a first gaming machine having a first movable display and a second gaming machine having a second movable display. In at least one implementation, the gaming system of the present invention may include:

automatically moving the first movable display to a first position;

automatically moving the second movable display to a second position; and coordinating movement of the first and second movable displays in order to facilitate multi-player features.

In at least one embodiment, various aspects of the present invention are directed to different methods, gaming machines, bonus devices, systems, and computer program products for operating a gaming system including a plurality of gaming machines each adapted to receive a wager on a game of chance, wherein the plurality of gaming machines includes a first gaming machine having a first movable display and a second gaming machine having a second movable display. In at least one implementation, the gaming system of the present invention may include:

automatically moving the first movable display to a first position;

automatically moving the second movable display to a second position;

coordinating movement of the first and second movable displays in order to facilitate multi-player features;

coordinating content displayed on the first and second movable displays in order to facilitate multi-player features.

In at least one embodiment, various aspects of the present invention are directed to different methods, gaming machines, bonus devices, systems, and computer program products for operating a gaming system including a plurality of gaming machines each adapted to receive a wager on a game of chance, wherein the plurality of gaming machines includes a first gaming machine having a first movable display and a second gaming machine having a second movable display. In at least one implementation, the gaming system of the present invention may include:

automatically moving the first movable display to a first position;

automatically moving the second movable display to a second position;

coordinating movement of the first and second movable displays in order to facilitate multi-player features;

wherein the multi-player features include at least one of: multi-player game play features, multi-player bonus features, and tournament gaming play features.

In at least one embodiment, various aspects of the present invention are directed to different methods, gaming machines, bonus devices, systems, and computer program products for operating a gaming system including a plurality of gaming machines each adapted to receive a wager on a game of chance, wherein the plurality of gaming machines includes a first gaming machine having a first movable display and a second gaming machine having a second movable display. In at least one implementation, the gaming system of the present invention may include:

automatically moving the first movable display to a first position;

automatically moving the second movable display to a second position;

coordinating movement of the first and second movable displays in order to facilitate multi-player features;

implementing a virtualized display for displaying virtualized content using at least the first movable display and the second movable display;

displaying a first portion of the virtualized content on the first movable display; and displaying a second portion of the virtualized content on the second movable display.

In at least one embodiment, various aspects of the present invention are directed to different methods, gaming machines, bonus devices, systems, and computer program products for operating a gaming system including a plurality of gaming machines each adapted to receive a wager on a game of chance, wherein the plurality of gaming machines includes a first gaming machine having a first movable display and a second gaming machine having a second movable display. In at least one implementation, the gaming system of the present invention may include:

automatically moving the first movable display to a first position;

automatically moving the second movable display to a second position;

coordinating movement of the first and second movable displays in order to facilitate multi-player features;

implementing a virtualized display for displaying a virtual environment using at least the first movable display and the second movable display;

displaying a first portion of the virtual environment on the first movable display; and displaying a second portion of the virtual environment on the second movable display.

In at least one embodiment, various aspects of the present invention are directed to different methods, gaming machines, bonus devices, systems, and computer program products for operating a gaming system including a plurality of gaming machines each adapted to receive a wager on a game of chance, wherein the plurality of gaming machines includes a first gaming machine having a first movable display and a second gaming machine having a second movable display. In at least one implementation, the gaming system of the present invention may include:

automatically moving the first movable display to a first position;

automatically moving the second movable display to a second position;

coordinating movement of the first and second movable displays in order to facilitate multi-player features;

implementing a virtualized display for displaying a virtual environment using at least the first movable display and the second movable display;

displaying a first portion of the virtual environment on the first movable display; and displaying a second portion of the virtual environment on the second movable display;

wherein the virtual environment corresponds to a virtual 3-D environment.

In at least one embodiment, various aspects of the present invention are directed to different methods, gaming machines, bonus devices, systems, and computer program products for operating a gaming system including a plurality of gaming machines each adapted to receive a wager on a game of chance, wherein the plurality of gaming machines includes a first gaming machine having a first movable display and a second gaming machine having a second movable display. In at least one implementation, the gaming system of the present invention may include:

automatically moving the first movable display to a first position;

automatically moving the second movable display to a second position;

coordinating movement of the first and second movable displays in order to facilitate multi-player features;

implementing a virtualized display for displaying a virtual environment using at least the first movable display and the second movable display;

displaying a first portion of the virtual environment on the first movable display;

displaying a second portion of the virtual environment on the second movable display; and displaying a virtual object traversing across the first and second portions of the virtual environment.

In at least one embodiment, various aspects of the present invention are directed to different methods, gaming machines, bonus devices, systems, and computer program products for operating a bonus device adapted for use with a gaming machine configured or designed to receive a wager on a game of chance. In at least one implementation, the bonus device of the present invention may include:

at least one interface;

a movable display; and a motion control device for controlling movement of the movable display;

wherein the bonus device is configured or designed to dynamically move the movable display in response to at least one signal received from a controller of the gaming machine.

In at least one embodiment, various aspects of the present invention are directed to different methods, gaming machines, bonus devices, systems, and computer program products for operating a bonus device adapted for use with a gaming machine configured or designed to receive a wager on a game of chance. In at least one implementation, the bonus device of the present invention may include:

at least one interface;

a movable display; and a motion control device for controlling movement of the movable display;

wherein the bonus device is configured or designed to dynamically move the movable display in response to at least one signal received from a controller of the gaming machine;

wherein the bonus device is further configured or designed to dynamically change its volume by moving the first movable display.

In at least one embodiment, various aspects of the present invention are directed to different methods, gaming machines, bonus devices, systems, and computer program products for operating a bonus device adapted for use with a gaming machine configured or designed to receive a wager on a game of chance. In at least one implementation, the bonus device of the present invention may include:

at least one interface;

a movable display; and a motion control device for controlling movement of the movable display;

wherein the bonus device is configured or designed to dynamically move the movable display in response to at least one signal received from a controller of the gaming machine;

wherein the volume of the bonus device corresponds to a physical space defined by a plurality of exterior surfaces of the bonus device.

In at least one embodiment, various aspects of the present invention are directed to different methods, gaming machines, bonus devices, systems, and computer program products for operating a bonus device adapted for use with a gaming machine configured or designed to receive a wager on a game of chance. In at least one implementation, the bonus device of the present invention may include:

at least one interface;

a movable display; and a motion control device for controlling movement of the movable display;

wherein the bonus device is configured or designed to:

dynamically move the movable display in response to at least one signal received from a controller of the gaming machine; and dynamically change its viewable surface area by moving the first movable display.

In at least one embodiment, various aspects of the present invention are directed to different methods, gaming machines, bonus devices, systems, and computer program products for operating a bonus device adapted for use with a gaming machine configured or designed to receive a wager on a game of chance. In at least one implementation, the bonus device of the present invention may include:

at least one interface;

a movable display;

a motion control device for controlling movement of the movable display;

a plurality of movable displays configured to form a movable display tower.

In at least one embodiment, various aspects of the present invention are directed to different methods, gaming machines, bonus devices, systems, and computer program products for operating a bonus device adapted for use with a gaming machine configured or designed to receive a wager on a game of chance. In at least one implementation, the bonus device of the present invention may include:

at least one interface;

a movable display; and a motion control device for controlling movement of the movable display;

a plurality of movable displays configured to form a movable display tower;

the movable display tower being adapted to dynamically change its volume by moving at least one of the movable displays.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A gaming machine adapted to receive a wager on a game of chance, the gaming machine comprising:

- a housing;
- at least one processor;
- at least one interface;
- a memory;
- a first movable display device including one or more first electronic display regions;
- a second movable display device including one or more second electronic display regions; and
- at least one drive mechanism, wherein:
  - the first movable display device and the second movable display device are arranged in a telescoping configuration, and
  - the at least one drive mechanism is configured to telescope the first movable display device and the second movable display device out of the housing such that the first movable display device is in a first deployed position and the second movable display device is in a second deployed position and the second movable display device is translated out of the housing to a greater extent than the first movable display device.

2. The gaming machine of claim 1 being further configured or designed to:

- receive a wager on a game of chance,
- generate an outcome for the game of chance, and
- dispense money or an indicia of credit for a monetary value in response to the outcome.

3. The gaming machine of claim 1 being further configured or designed to dynamically change its viewable surface area by moving the first movable display device while content is being displayed on the one or more first electronic display regions.

4. The gaming machine of claim 1 wherein the gaming machine is configured or designed to move the first movable display device to a third position different from the first deployed position.

5. The gaming machine of claim 1 wherein the first movable display device and the second movable display device are positioned to form a display device tower, and wherein the gaming machine is further configured to adjust the height of the display device tower by moving at least one of the first movable display device or the second movable display device.

6. The gaming machine of claim 1 wherein the gaming machine is configured to:

- detect the occurrence of a first event, and
- issue the first command in response to detecting the first event.

7. The gaming machine of claim 6 wherein the first event corresponds to a game-related event.

8. The gaming machine of claim 6 wherein the first event corresponds to a bonus-related event.

9. The gaming machine of claim 6 wherein the first event occurs at the gaming machine.

10. The gaming machine of claim 6 wherein the first event occurs at a remote device.

11. The gaming machine of claim 6 wherein the first event corresponds to at least one of: randomly-based events, target-based events, time-based events, game-based events, and player-based events.

12. The gaming machine of claim 1, wherein the gaming machine is further configured to:

- move the first movable display device to the first deployed position, and
- display a first portion of content on the one or more first electronic display regions,
- wherein the first portion of content corresponds to content relating to the game of chance.

13. The gaming machine of claim 1, wherein the gaming machine is further configured to:

- move the first movable display device to the first deployed position, and
- display a first portion of content on the one or more first electronic display regions,
- wherein the first portion of content corresponds to content relating to bonus play.

14. The gaming machine of claim 1, wherein the gaming machine is further configured to:

- move the first movable display device to the first deployed position, and
- display a first portion of content on the one or more first electronic display regions,
- wherein the first portion of content is obtained from a remote device.

15. The gaming machine of claim 1, wherein the gaming machine is further configured to:

move the first movable display device to the first deployed position, and display a first portion of content on the one or more first electronic display regions, wherein the first portion of content is obtained from an advertiser.

16. The gaming machine of claim 1, wherein the gaming machine is further configured to:

move the first movable display device to the first deployed position, move the second movable display device to the second deployed position, display a first portion of content on the one or more first electronic display regions, and display a second portion of the content on the one or more second electronic display regions.

17. The gaming machine of claim 1 further comprising:

a virtual display controller configured to implement a virtualized display for displaying virtualized content using at least the first movable display device and the second movable display device, the virtual display controller configured to:

display a first portion of the virtualized content on the one or more first electronic display regions, and display a second portion of the virtualized content on the one or more second electronic display regions.

18. The gaming machine of claim 1 further comprising:

a virtual display controller configured to implement a virtualized display for displaying rendered images of a virtual environment using at least the first movable display device and the second movable display device, the virtual display controller configured to:

display a first rendered image of the virtual environment on the one or more first electronic display regions, and display a second rendered image of the virtual environment on the one or more second electronic display regions.

19. The gaming machine of claim 18 wherein the virtual display controller is further configured to display a virtual object traversing from the first rendered image of the virtual environment to the second rendered image of the virtual environment.

20. The gaming machine of claim 18 wherein the virtual environment corresponds to a virtual 3-D environment.

21. The gaming machine of claim 1 further comprising:

a virtual display controller configured to divide display content comprising a still image or a sequence of images between at least two electronic display devices, wherein the gaming machine is further configured to display a first portion of the display content on the one or more first electronic display regions and display a second portion of the display content on the one or more second electronic display regions.

22. A gaming system including a plurality of gaming machines each adapted to receive a wager on a game of chance, the gaming system comprising:

a first gaming machine having a first movable display device including one or more first electronic display regions and a second movable display device including one or more second electronic display regions, the first movable display device and the second movable display device configured to telescope out of the first gaming machine such that the second movable display device extends out of the first gaming machine to a greater extent than the first movable display device;

a second gaming machine having a third movable display device including one or more third electronic display regions and a fourth movable display device including one or more fourth electronic display regions, the third movable display device and the fourth movable display device configured to telescope out of the second gaming machine such that the fourth movable display device extends out of the second gaming machine to a greater extent than the third movable display device; and at least one controller configured to coordinate telescoping movement of the first, second, third, and fourth movable display devices between the first and second gaming machines in order to facilitate multi-player features.

23. The gaming system of claim 22 wherein the at least one controller is further configured to coordinate content displayed on the first and second electronic display regions with content displayed on the third and fourth electronic display regions in order to facilitate multi-player features.

24. The gaming system of claim 22 wherein the multi-player features include at least one of: multi-player game play features, multi-player bonus features, and tournament gaming play features.

25. The gaming system of claim 22 further comprising:

a virtual display controller configured to implement a virtualized display for displaying virtualized content using at least the first and second electronic display regions and the third and fourth electronic display regions, the gaming system further configured to:

display a first portion of the virtualized content on the first and second electronic display regions; and display a second portion of the virtualized content on the third and fourth electronic display regions.

26. The gaming system of claim 22 further comprising:

a virtual display controller configured to implement a virtualized display for displaying a virtual environment using at least the first movable display device and the second movable display device, the gaming system further configured to display a first portion of the virtual environment on the one or more first electronic display regions and the one or more second electronic display regions and display a second portion of the virtual environment on the one or more third electronic display regions and the one or more fourth electronic display regions.

27. The gaming system of claim 26 wherein the virtual environment corresponds to a virtual 3-D environment.

28. The gaming system of claim 26, further configured to display a virtual object traversing across the first and second portions of the virtual environment.

29. A method of operating a gaming machine adapted to receive a wager on a game of chance, the gaming machine including a housing, a first movable display device, and a second movable display device, the method comprising using a processor to execute the steps of:

moving the first movable display device to a first deployed position and the second movable display device to a second deployed position in response to one or more commands from the processor and telescoping the first movable display device and the second movable display device out of the housing such that the first movable display device is in the first deployed position and the second movable display device is in the second deployed position and the second movable display device is translated out of the housing to a greater extent than the first movable display device.

30. A method of operating a gaming system including a plurality of gaming machines each adapted to receive a wager on a game of chance, the plurality of gaming machines including a first gaming machine having a first movable display device including one or more first electronic display regions and a second movable display device including one or more second electronic display regions, the first movable display device and the second movable display device configured to telescope out of the first gaming machine such that the second movable display device extends out of the first gaming machine to a greater extent than the first movable display device, and a second gaming machine having a third movable display device including one or more third electronic display regions and a fourth movable display device including one or more fourth electronic display regions, the third movable display device and the fourth movable display device configured to telescope out of the second gaming machine such that the fourth movable display device extends out of the second gaming machine to a greater extent than the third movable display device, the method comprising using a processor to execute the steps of:

telescoping the first and second movable display devices out of the first gaming machine;

telescoping the third and fourth movable display devices out of the second gaming machine; and coordinating movement of the first and the second movable display devices with movement of the third and the fourth movable display devices in order to facilitate multi-player features.

31. A bonus device adapted for use with a gaming machine configured or designed to receive a wager on a game of chance, the bonus device comprising:

at least one interface;

a housing;

a first movable display device including one or more first electronic display regions;

a second movable display device including one or more second electronic display regions;

at least one drive mechanism; and a motion control device configured to control movement of the first movable electronic display device and the second movable electronic display device, wherein:

the bonus device is configured to move the first movable display device and the second movable display device in response to at least one signal received from a controller of the gaming machine via the at least one interface, the first movable display device and the second movable display device are arranged in a telescoping configuration, and the at least one drive mechanism is configured to telescope the first movable display device and the second movable display device out of the housing such that the first movable display device is in a first deployed position and the second movable display device is in a second deployed position and the second movable display device is translated out of the housing to a greater extent than the first movable display device.

32. The bonus device of claim 31, the bonus device further configured to change the bonus device volume by moving the first movable display device or the second movable display device.

33. The bonus device of claim 31, the bonus device further configured to change a viewable surface area of the bonus device by moving the first movable display device or the second movable display device.

34. The bonus device of claim 31, wherein the first movable display device and the second movable display device are configured to form a movable display device tower and wherein the first movable display device is configured to be movable to the first deployed position located above the housing and the second movable display device is configured to be movable to the second deployed position located above the first deployed position.

35. The bonus device of claim 34, wherein the first movable display device and the second movable display device are configured to change the volume of the movable display device tower when moved.

36. The gaming machine of claim 1, wherein:

the first movable display device includes a first surface and a second surface, the first surface on an opposite side of the first movable display device from the second surface, and the first surface and the second surface defining a portion of an outer housing of the first display device, the second movable display device includes a third surface and a fourth surface, the third surface on an opposite side of the second movable display device from the fourth surface, the third surface and the fourth surface defining a portion of an outer housing of the second display device, and the third surface oriented in substantially the same direction as the first surface, the first surface and the fourth surface are substantially perpendicular to a direction of translation for the first movable display device and the second movable display device, and the first surface and the fourth surface are substantially proximate when the first movable display device is in the first deployed position and the second movable display device is in the second deployed position.

* * * * *